United States Patent [19]
Ervin

[11] 3,813,478
[45] May 28, 1974

[54] FLEXIBLE ELECTRICALLY CONDUCTIVE CHAIN AND METHOD OF MAKING THE SAME

[75] Inventor: Gerald A. Ervin, Calabasas, Calif.

[73] Assignee: Samuel W. Ford, Pacoima, Calif. ; a part interest

[22] Filed: Oct. 30, 1972

[21] Appl. No.: 302,259

[52] U.S. Cl................ 174/70 R, 59/35, 59/78.1, 59/87, 200/168 E, 240/78 E, 339/191 R, 339/195 R
[51] Int. Cl.......................F16g 13/18, B211 17/00
[58] Field of Search............ 174/68 R, 70 R, 59/12, 59/35, 78.1, 87, DIG. 1; 200/168 E; 240/78 E; 339/147 R, 149 R, 191 R, 195 R; 249/57

[56] References Cited
UNITED STATES PATENTS

| | | | |
|---|---|---|---|
| 193,295 | 7/1877 | Thompson | 59/87 |
| 1,098,779 | 6/1914 | Blake | 59/78.1 |
| 1,233,538 | 7/1917 | Alden | 59/78.1 |
| 1,686,362 | 10/1928 | Arras | 59/78.1 |
| 1,914,993 | 6/1933 | D'Olier, Jr. | 240/78 E X |
| 2,103,986 | 12/1937 | Johnson | 240/78 E X |
| 3,188,794 | 6/1965 | Johnson | 59/78.1 |

FOREIGN PATENTS OR APPLICATIONS

| | | | |
|---|---|---|---|
| 304,412 | 1/1929 | Great Britain | 59/78.1 |
| 22,988 | 1909 | Great Britain | 240/78 E |

*Primary Examiner*—Laramie E. Askin
*Attorney, Agent, or Firm*—Henry M. Bissell

[57] ABSTRACT

An improved flexible electrically conductive chain is provided which comprises a plurality of spaced conductor links, each of which includes an external shell defining an enclosed internal passageway, apertures extending through the shell in communication with the passageway adjacent opposite ends of the link, and a plurality of support links. The links preferably are in the configuration of a peripheral shell with central opening, with individual support links disposed between and interconnecting adjacent conductor links through said openings. A flexible conductor is disposed within said passageways, through said apertures and external of said support links. The support links space the conductor links a distance apart which permits free flexing and bending of the conductor and chain without loadbearing or strain on the conductor.

The improved chain can be made of a number of methods, including a novel procedure wherein the conductor links are simultaneously molded around the conductor, with joining studs which maintain conductor link spacing. Such studs can be later removed. The support links are then attached to form the finished chain.

10 Claims, 10 Drawing Figures

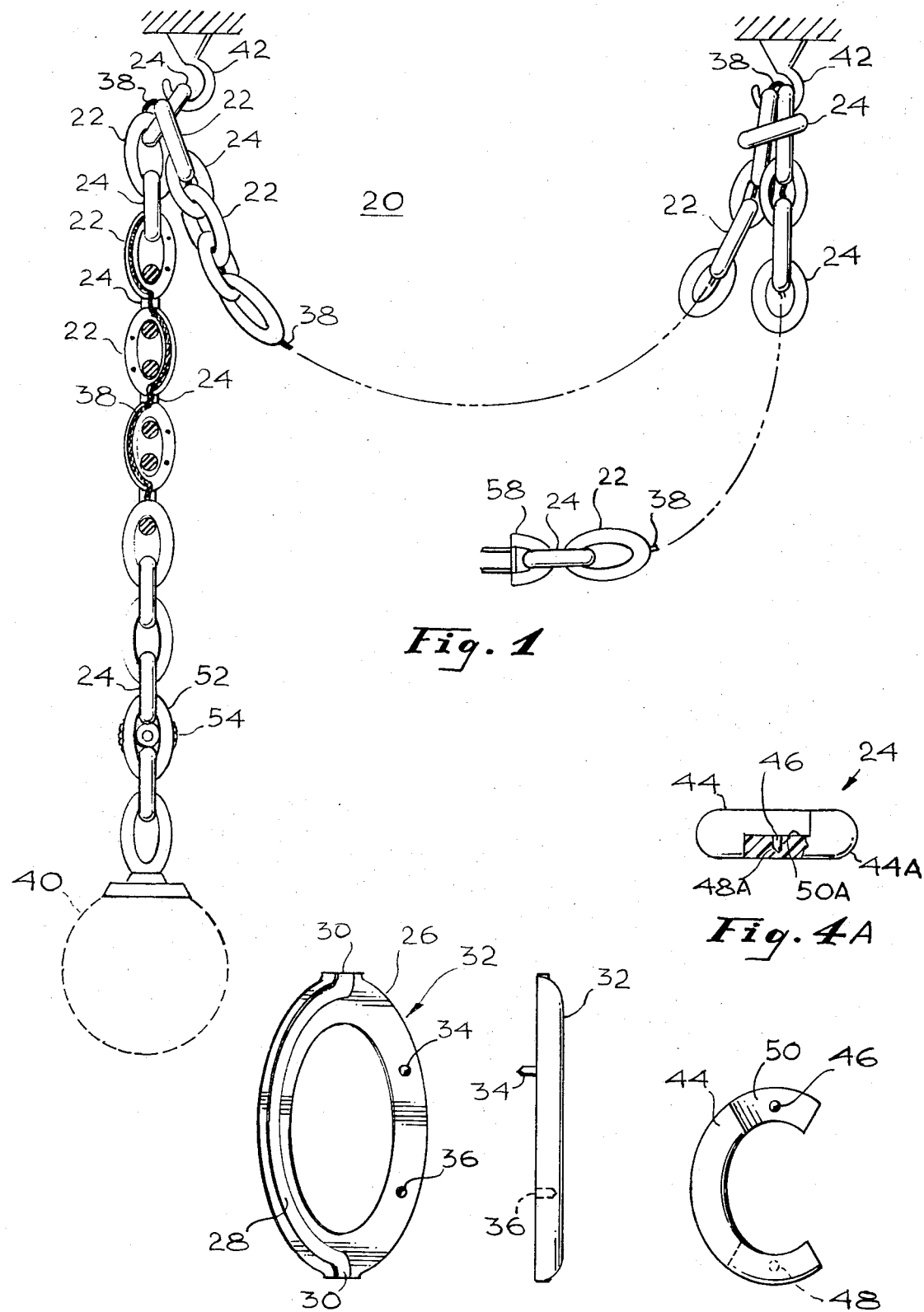

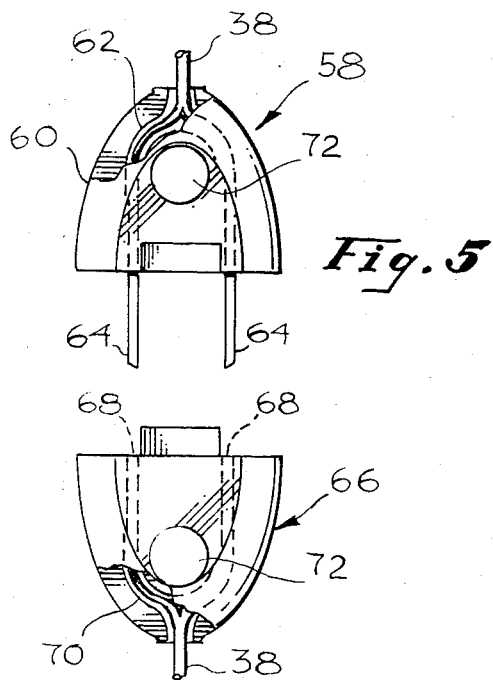
Fig. 5
Fig. 6
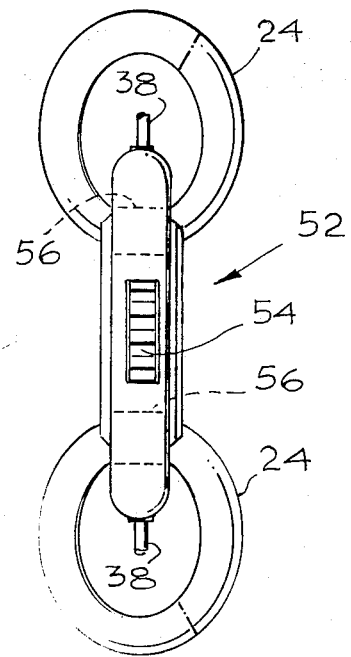
Fig. 7
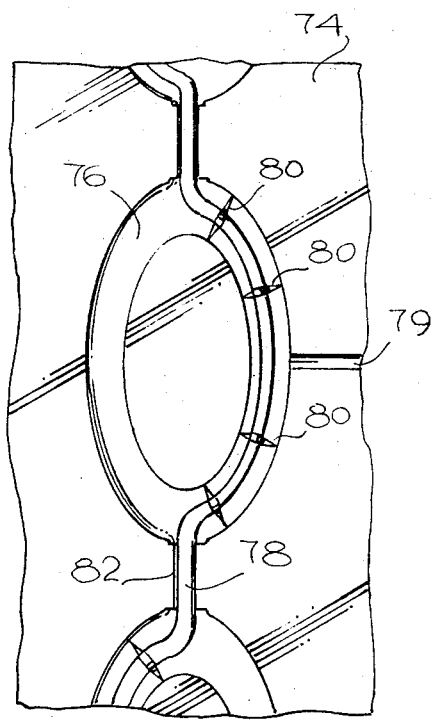
Fig. 8
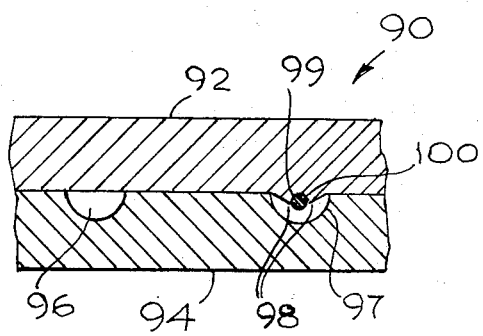
Fig. 9

FLEXIBLE ELECTRICALLY CONDUCTIVE CHAIN AND METHOD OF MAKING THE SAME

BACKGROUND OF THE INVENTION

1. Field of the Invention

The present invention generally relates to chains for supporting hanging electrical fixtures and, more particularly, to such chains having electrical conductors integrally incorporated therein.

2. Description of the Prior Art

Electrically conductive chains, such as are used to interconnect a hanging electrical lamp, beam, sign or the like with an electrical outlet, generally provide an electrical conductor externally intertwined among the links of the chain. Such an arrangement lacks aesthetic appeal, since the conductor wire, even if it is the same color as the chain, is readily visible. Certain of such chains enclose the conductor therewithin, but usually such chains are of a different configuration and appearance than the interconnected-links type of chain generally desired for decorative purposes.

In another type of conventional electrically conductive chain, the proper link configuration is provided, but the links are rigidly interconnected so that the chain cannot freely drape or bend to suit the particular needs of the user. While in some instances certain support links may be freely moveable, those links bearing the conductor wire are rigidly interconnected, thus rendering the entire chain inflexible.

Other types of such chains, while flexible, permit the enclosed electrical conductor to bear much of the weight of the object suspended by the chain and/or do not permit flexing and bending of the chain without introducing a strain on the conductor with consequent rupture thereof over a period of time.

Accordingly, it would be desirable to overcome the described problems with an improved type of chain.

SUMMARY OF THE INVENTION

The foregoing difficulties have now been overcome by the improved electrically conductive chain of the present invention The chain and an improved method of making the same are substantially as set forth in the Abstract above. The improved chain is flexible, with individual links acting independently. Yet the chain encloses and conceals a continuous electrical conductor to supply electricity to the associated electrical fixture.

The chain can be draped, bent, turned and angled without strain on the conductor. Moreover, the links of the chain carry the entire weight of the chain and any load affixed thereto, so that the conductor does not have to bear any load weight. Accordingly, the life of the conductor is improved, and the chain has an improved appearance. Moreover, since the links of the chain are not rigidly bound together, the chain in all respects functions in the manner of a conventional non-electrical chain. The appearance of the chain is further enhanced by providing a line cord switch, and male and female connector plugs with the configuration, appearance and function of links and disposing them, as needed or desired, in the chain. The plug links advantageously permit extension of the chain by coupling sections together, thus adding to the versatility of the invention in various applications as desired.

The method of the present invention permits the conductor to be integrally molded into the spaced plurality of conductor links in a single operation with minimized fabrication and assembly costs. The support links are then positioned in the chain to complete the construction.

BRIEF DESCRIPTION OF THE DRAWING

A better understanding of the present invention may be had from a consideration of the following detailed description, taken in conjunction with the accompanying drawing, in which:

FIG. 1 is a schematic perspective view of a preferred embodiment of the chain of the present invention in a typical application as a hanging lamp electrical connection and support means, portions of several conductor links and support links thereof being removed to illustrate the internal construction thereof;

FIG. 2 is an enlarged schematic side elevation of one-half of a conductor link in the chain of FIG. 1;

FIG. 3 is an enlarged schematic end view of the conductor link half of FIG. 2;

FIG. 4 is an enlarged schematic side elevation of one-half of a support link in the chain of FIG. 1;

FIG. 4A is a partial sectional view, showing two halves of the support link fastened together;

FIG. 5 is an enlarged schematic side elevation of a male plug connector half-link in the chain of FIG. 1 with portions broken away to illustrate the internal construction thereof;

FIG. 6 is an enlarged schematic side elevation of a female plug connector half-link mateable with the male plug half-link of FIG. 5, portions being broken away to illustrate the internal construction thereof;

FIG. 7 is an enlarged schematic end view of an electrical switch in the form of a connector link, as shown in FIG. 1;

FIG. 8 is a schematic top plan view of a portion of a mold, illustrating the cavity thereof with a conductor positioned therewithin, prior to molding of a plurality of interconnected conductor links around said conductor; and FIG. 9 is a sectional view of a mold for fashioning particular arrangements in accordance with the invention.

DESCRIPTION OF THE PREFERRED EMBODIMENTS

Referring particularly to FIG. 1 of the accompanying drawings, a preferred embodiment of the improved electrically conductive chain of the invention is schematically illustrated in perspective view. As shown in FIG. 1, a chain 20 is provided which comprises a plurality of spaced conductor links 22 interconnected in chain 20 by support links 24. Each support link 24 is disposed between and interconnects adjacent conductor links 22. The links are of the closed perimeter, open center type or the like and may be oval, square, oblong or of any other shape.

Each conductor link 22 comprises an external shell 26 defining at least one enclosed internal passageway 28 (FIG. 2) and apertures 30 which are adjacent opposite ends of links 22 and extend therethrough into communication with passageway 28. As shown particularly in FIGS. 2 and 3, each link 22 can be formed of mating half links 32 releasably joined together by means of a pin 34 and socket 36 in each half link 32. Alternatively, links 22 can be formed so as to permanently enclose passageway 28, (not shown), as by molding in accordance with the novel method hereafter more particularly described.

The spaced set of links 22 in chain 20 have disposed therein a continuous flexible electrical conductor 38 which may comprise, for example, a plurality of copper wires electrically insulated from one another and from links 22. Other suitable conventional electrical conductors such as cables or the like can be used, as within the skill of one versed in the art. Preferably, links 22 are fabricated of electrically insulative material such as conventional thermoplastic or thermosetting resin, e.g. polytetrafluoroethylene, polyvinyl chloride, polyethylene, polystyrene or the like. Other materials may be employed, if desired.

It will be noted that in the embodiment illustrated in FIG. 1, conductor 38 assumes a serpentine path, traversing from one side of chain 20 to the other, in passing through successive links 22. However, it will be understood that links 22 can, if desired, be arranged so that passageways 28 are all on one side of chain 20. Alternatively passageways 28 can be provided in both sides of each link 22 for receiving the conductor 38 which may vary as to form. For example, it may be formed in a multiple, separately sheathed wire form so that a portion thereof can occupy each side of each link 22 (not shown) throughout all or a portion of chain 20.

It will also be noted that links 22 are physically spaced from each other and that conductor 38 runs between links 22 as well as through links 22. Accordingly, the portions of conductor 38 between links 22 are exposed and are external of all links of chain 20. In order to prevent conductor 38 from having to bear any weight load from the weight of chain 20 itself and any attached objects, for example, a hanging lamp 40 (FIG. 1), support links 24 are provided in chain 20, which links 24 space adjacent links 22 a maximum distance apart which is not any greater than and preferably is somewhat less than the length of the exposed portion of conductor 38 between adjacent links 22. Accordingly, the great bulk of the load bearing is provided by links 22 and 24 rather than conductor 38. In fact, so long as links 22 and 24 are unbroken, there is no effective load on conductor 38.

With such an arrangement, the spacing between links 22 imparts flexibility to chain 20 and permits it to be folded, bent, angled, turned and otherwise configured, all without any strain or potential damage to conductor 38 along its exposed portions or otherwise. Thus, as shown in FIG. 1, portions of chain 20 are draped over hooks 42. In the course of such positioning of chain 20, some of the chain links are partially rotated, all without injury to conductor 38.

Since the support links 24 do not house conductor 38 but instead support and interconnect links 22 and shield exposed portions of conductor 38 from view, links 24 can be of any suitable construction. In this regard, as shown in FIGS. 4 and 4A, links 24 preferably comprise two detachable mating halves 44 and 44A, each half bearing, for example, a pin 46 and a socket 48 of the like connecting means. In the embodiment shown in FIGS. 4 and 4A, each half 44, 44A may have an offset portion 50 or 50A or reduced thickness for overlapping to aid in matching the halves together and forming the sites for the connecting means.

It will be understood that, if desired, links 24 could be made of material which could be twisted, bent or otherwise made to open and close for connecting the same to links 22 and disconnecting therefrom. Moreover, links 24 can be solid or hollow and of simple unitary construction, and can be solid or hollow and of simple unitary construction, and can be fabricated from materials the same as or different from links 22. Links 24 interconnect adjacent links 22 through the central openings in the latter in a manner to provide the conventional configuration of non-electrical support chains.

Chain 20 may also be provided with switch means, for example, in the form shown in FIGS. 1 and 7. In this regard for aesthetic purposes it is preferred to provide such switch means in the form of a specialized connector link 52 having the appearance of links 22 but with conventional internal electrical switch construction (not shown). Link 52 has an externally exposed knurled switch wheel 54 and apertures 56 to receive adjoining interconnecting support links 24.

Means preferably are also provided for connecting chain 20 to an associated electrical fixture, for example, the lamp 40, to be supplied with current, and to the current source, for example, an electrical outlet. For aesthetic purposes, it is preferred that such means have the configuration and appearance of half or full links of chain 20. Thus, as shown in FIGS. 1 and 5, a male connector plug 58 comprising a specialized connector half link can be provided. Plug 58 has a peripheral shell 60 defining a bifurcated central passageway 62 within which connector 38 is connected with a pair of spaced prongs 64. Prongs 64 extend outwardly from shell 60 for connection with an electrical outlet or with a female plug 66, such as is shown in FIG. 6.

Plug 66 is the mating half of a conductor link, and provides a pair of spaced channels 68 for reception of prongs 64, channels 68 forming a part of a passageway 70 within which conductor 38 is disposed for electrical contact with prongs 64. The remaining components of plug 66 are similar to and match those of plug 58, so that when plugs 58 and 66 are mated, they form a conductor link having an opening 72 through which adjacent links 24 can pass for interconnection therewith in chain 20. Sets of plugs 58 and 66 can be used, for example, in conjunction with interconnected links 22 and 24 to increase or decrease the overall length of chain 20.

METHOD

Chain 20 and equivalents can be fabricated in any suitable manner, utilizing any suitable starting materials, as previously indicated. A preferred method of the present invention, provides for the manufacture of a chain in accordance with the invention, which chain has the conductor permanently bonded to and within the conductor links.

The present method comprises disposing a flexible electrical conductor within the cavity of a mold and supporting it within such cavity in a serpentine path and out of direct contact with the cavity walls. The mold is then closed and filled with moldable material under molding conditions to mold a plurality of conductor links around the conductor so as to wholly and permanently enclose the same.

The cavity in the mold is configured such that conductor links of desired size and shape are uniformly spaced along and enclose the conductor. The spaced conductor links are connected together in the mold during the molding operation, by means of extensions or studs surrounding the conductor between conductor links.

After the molding step is completed, the molded product is removed from the mold and any plastic molding material between th links is broken away to free the conductor and separate the individual connector links. Thereafter, separately molded support links are attached in the chain between adjacent conductor links to form the finished chain, with the spacing between conductor links conforming to the previously described requirement.

In an alternative embodiment, the mold cavity is divided into a plurality of sub-cavities by disposing therein previously formed studs bearing conductor passageways. Each sub-cavity has the configuration necessary to mold a conductor link around the portion of conductor disposed therein. After the molding operation, the molded product is removed from the mold and the studs are removed from the product. Assembly of the chain then is completed as previously described. Further features of the present method are illustrated by the following specific Example.

EXAMPLE

Conventional medium density polyethylene thermoplastic resin is introduced into a heated closed mold in liquified form at a temperature of about 75° F. in excess of the melting point thereof. The arrangement is schematically shown in FIG. 8 and includes a mold 74 defining a cavity 76. The mold 74 has a three wire flexible copper electrical conductor cord 78 sheathed in high temperature flexible plastic disposed in hollow cavity 76 therein in a serpentine path conforming to that to be found in the finished electrically conductive chain. Conductor 78 is supported in the cavity by a plurality of thin, perforated plastic collars 80 which suspend conductor 78 out of direct contact with the defining cavity 76 wall. Cavity 76 is configured to outline a plurality of spaced conductor links of oval configuration having a continuous periphery surrounding a central opening. Such links are to be molded around the conductor with suitable spacing between the links in the area shown in FIG. 8 as 82.

Mold 74 is filled with the liquified plastic via channels such as 79, then allowed to cool to room temperature and finally opened to remove the molded product. Support links of the same general overall configuration as the conductor links and comprising two detachable mating halves as shown in FIGS. 4 and 4A which are formed of the same material as the conductor links in a separate molding operation, are then connected to the conductor links. The manner of connection is such that a support link is disposed between and connected to adjacent conductor links in the chain to form a regularly alternating pattern. The support links are dimensioned to position adjacent conductor links a distance less than the length of exposed conductor between adjacent conductor links, whereby the resulting chain is durable, flexible, inexpensive and attractive.

A similar chain is also produced utilizing the same steps and parameters as set forth above, but substituting previously formed studs in the mold, such studs having central passageways extending into which the conductor is passed before the molding operation begins.

FIG. 9 represents a cross-section of a mold for fabricating conductor lengths with an integral conductor in accordance with another aspect of the invention. The mold 90 of FIG. 9 may be similar to that as shown in FIG. 8 with minor differences which will be noted. The mold 90 comprises an upper block 92 and a lower block 94 adapted to be locked together for the molding operation and separated for removal of the molded components. The lower block 94 contains cavities 96 and 97 for one half of the conductor links 22, divided longitudinally along the plane of the link. These cavities 96, 97 are of the general configuration of the link cavity 76 shown in FIG. 8 and provide molded links which have internal passageways for the conductors within an external molded shell. As indicated in FIG. 8, there are apertures at opposite ends of the link through which the conductors may communicate with the internal passages. The mold 90 contains a series of necked-down portions such as 82 between adjacent link cavities and may be of sufficient length to form one-half of an entire chain in a single molding operation or, if desired, may be of a length suitable to form segments of a half-chain with repetitive molding operations required to complete the entire length of the half-chain.

The upper mold block 92 is flat along its entire surface adjacent the lower block 94 except for the projections 98 which protrude outwardly from the block 92 and project downward into the cavity 97 when the blocks 92, 94 are joined for the molding operation. The projections 98 define a longitudinal recess 99 which serves the purpose of retaining and guiding a wire conductor 100 for positioning within the plastic to be molded by the mold 90. This wire 100 may be a bare, stranded copper wire of the type commonly used for electrical cords, and it can be used without special insulation in electrical fixture support chains of the present invention because of the molding process employed as described herein which utilizes a molded insulating material for the chain conductor links. The projections 98 and recess 99 will be formed along the surface of the upper mold block 92 communicating with the cavity 97 to channel the bare conductor 100 along the path generally indicated for the line cord 78 of FIG. 8 (the internal passageways within the molded shell). Thus, the wire 100 is completely isolated from the periphery of the link except at the very ends thereof where it extends through the apertures formed by the wire itself.

In the molding process described in conjunction with FIG. 9, two half-chains will be molded in two successive operations using the mold 90. Thus, two separate wires 100 will be molded in this fashion, one in each of the half-chains developed by the mold 90. It can be observed that when the half-links molded in this fashion are positioned for joining together, the portion filling the cavity 97 of one half-link will be joined to the portion filling the cavity 96 of the other half-link, thus insuring spatial isolation of the respective wires 100 so that there is no possibility of their coming in contact to short-circuit the wiring within the internal passageways of the conductor links 22. At the two ends of a link, the conductors 100 may be recessed slightly in their respective half-links by having the projections 98 extend a little deeper into the cavity 97. Before the two half-chains are joined together, the portions of the bare wires 100 in which the wires are adjacent each other, as at the ends of the links 22 and for the extent of the wires 100 between adjacent links 22, are provided with suitable insulation, as by wrapping, spraying, dipping or by some other equivalent step which insures that adequate insulation is provided so that there is no danger of any short circuit from one wire 100 to the other. Such insulation between adjacent links will be as flexible as the line cord insulation already described for other embodiments of the invention, so that the chain comprising the conductor links 22 and support links 24 can flex, twist and bend as already indicated.

Provision of a conductor chain in this manner provides a number of advantages. The entire assembly is cheaper to manufacture, since it is unnecessary to buy preinsulated wire for use as the electrical conductor in the chain. Moreover, since the normal insulation of pre-insulated line cord is eliminated, the cross-sectional dimension of the wire is reduced, thus permitting the use of conductor links of smaller cross-sectional dimension to effectively encase the conductors therein. Furthermore, fabrication by molding in this fashion is more adaptable to modern mass production techniques which further reduce the cost of the conductive link chains in accordance with the present invention.

After the conductors and conductor links are molded together in this fashion, the wires are insulated as needed, and the respective half-chains are joined together.

Accordingly, an improved electrically conductive chain is provided which is useful in a wide variety of applications, both as a decorative and as a functional item of considerable strength, durability, appearance, and adaptability.

Various modifications, alterations, changes and additions can be made in the chain of the present invention and in its components, and also in the present methods and the steps thereof. All such modifications, alterations, changes and additions as are within the scope of the appended claims form a part of the present invention.

What is claimed is:

1. An electrically conductive chain formed of separate conductor links connected together by support links and a pair of electrical conductors, wherein the conductor links comprise a series of molded shell portions formed of electrically insulative material within which the pair of conductors are disposed to extend the length of the chain, wherein the conductors are integrally molded within the conductor links, said conductor links enclosing the pair of conductors, and said conductors of said pair being insulated from each other along the entire length of said chain.

2. The improved chain of claim 1 wherein said chain includes a conductor link having an electrical switch in contact with one of said conductors.

3. The improved chain of claim 1 wherein said chain includes a conductor link comprising a mateable pair of detachable male and female electrically conductive plugs.

4. A chain as in claim 1 wherein the support links comprise mating halves, each being generally C-shaped and having a full segment situated between a pair of half-segments, the half-segments of one mating half being adapted to join to and overlap the respective half-segments of a corresponding mating half, whereby the support link may be formed in closed configuration after coupling to a pair of adjacent conductor links.

5. A method of making an improved electrically conductive chain, said method comprising:
disposing a flexible electrical conductor within a mold cavity;
supporting said conductor within said cavity in a serpentine path out of direct contact with the walls defining said cavity;
molding a plurality of spaced conductor links around said conductor in said cavity;
removing the resulting molded product from said cavity; and
interconnecting adjacent conductor links by coupling support links thereto.

6. The method of claim 5 wherein the molding step comprises forming a series of half-links containing the conductor therein.

7. The method of claim 6 wherein the conductor is a bare wire and further comprising the step of insulating exposed segments of said conductor between adjacent link halves.

8. The method of claim 7 further comprising the step of joining together a pair of molded halves prior to the interconnecting step.

9. The method of claim 5 wherein the supporting step comprises applying a series of collars to the conductor to keep it away from the walls of the cavity.

10. The method of claim 5 wherein the supporting step comprises maintaining the conductor fixed in position along a predetermined path against the flat side of a generally half-round cavity.

* * * * *